(12) United States Patent
Duffy et al.

(10) Patent No.: US 8,607,056 B2
(45) Date of Patent: Dec. 10, 2013

(54) DATA PROCESSING APPARATUS AND METHOD

(75) Inventors: Dominic Gavan Duffy, Cambridgeshire (GB); Carl Christopher Goodwin, Cambridgeshire (GB); Aled Wynne Jones, Cambridgeshire (GB); Dominic Frank Julian Binks, Cambridgeshire (GB)

(73) Assignee: Genkey Netherlands B.V., Eindhoven (NL)

( * ) Notice: Subject to any disclaimer, the term of this patent is extended or adjusted under 35 U.S.C. 154(b) by 0 days.

(21) Appl. No.: 12/896,101

(22) Filed: Oct. 1, 2010

(65) Prior Publication Data

US 2011/0022847 A1    Jan. 27, 2011

Related U.S. Application Data

(63) Continuation of application No. 10/467,831, filed as application No. PCT/GB02/00626 on Feb. 14, 2002, now abandoned.

(30) Foreign Application Priority Data

| Feb. 14, 2001 | (GB) | 0103656.5 |
| May 31, 2001 | (GB) | 0113254.7 |
| May 31, 2001 | (GB) | 0113255.4 |
| Aug. 9, 2001 | (GB) | 0119464.6 |

(51) Int. Cl.
    *H04L 9/32* (2006.01)
(52) U.S. Cl.
    USPC .......................... 713/179; 713/167; 713/172
(58) Field of Classification Search
    USPC ........................................................ 713/179
    See application file for complete search history.

(56) References Cited

U.S. PATENT DOCUMENTS

| 5,680,460 | A | * | 10/1997 | Tomko et al. | 713/186 |
| 6,154,543 | A | * | 11/2000 | Baltzley | 380/255 |
| 6,185,316 | B1 | * | 2/2001 | Buffam | 382/115 |
| 6,337,910 | B1 | * | 1/2002 | Goff et al. | 380/28 |
| 6,751,729 | B1 | * | 6/2004 | Giniger et al. | 713/153 |
| 6,892,304 | B1 | * | 5/2005 | Galasso et al. | 713/189 |
| 7,234,060 | B1 | * | 6/2007 | Amdur et al. | 713/176 |

(Continued)

OTHER PUBLICATIONS http://www.linuxjournal.com/article/3013?page=0,0, David, 1998.*

(Continued)

*Primary Examiner* — Kambiz Zand
*Assistant Examiner* — Yonas Bayou
(74) *Attorney, Agent, or Firm* — Smith Gambrell & Russell LLP

(57) ABSTRACT

Generating a cryptographic key, for example using a received external key. A system to generate a cryptographic key may include a first data store which may store an authorization key. A system may include a second data store which may store a secure key and/or a public key. A system may include an access controller, which may allow access to a secure key, for example to an access request which may be accompanied by a digital signature. A system may include a key generator, which may generate a private key, for example using a received external key, a stored authorization key and/or a mapping function. A system may include an access request signal generator which may generate a digital signature and/or which may transmit an access request, for example including a generated digital signature, to an access controller to retrieve a secure key.

13 Claims, 15 Drawing Sheets

(56) References Cited

U.S. PATENT DOCUMENTS

| | | | |
|---|---|---|---|
| 8,001,055 B2* | 8/2011 | Weiss | 705/76 |
| 2001/0034836 A1* | 10/2001 | Matsumoto et al. | 713/176 |
| 2002/0095573 A1* | 7/2002 | O'Brien | 713/168 |
| 2004/0019790 A1* | 1/2004 | Aono et al. | 713/172 |
| 2004/0111625 A1* | 6/2004 | Duffy et al. | 713/186 |
| 2005/0005112 A1* | 1/2005 | Someren | 713/167 |
| 2008/0216147 A1* | 9/2008 | Duffy | 726/1 |

OTHER PUBLICATIONS

Face Recognition With Biometric Encryption for Privacy-Enhancing Self-Exclusion.*

* cited by examiner

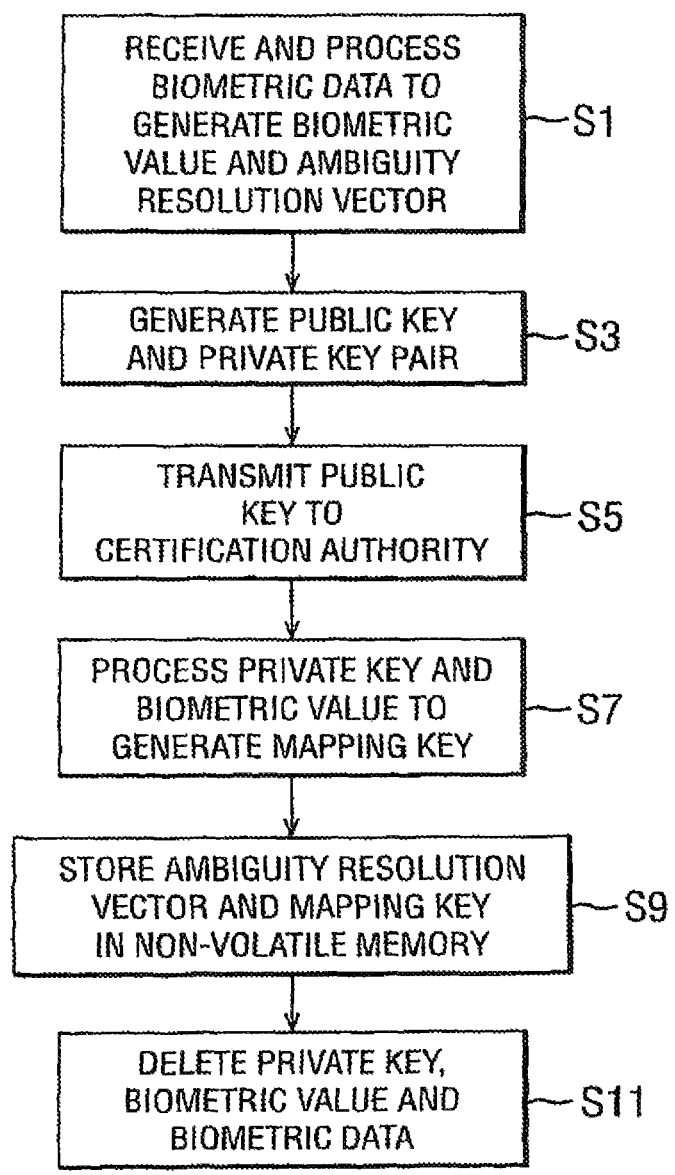

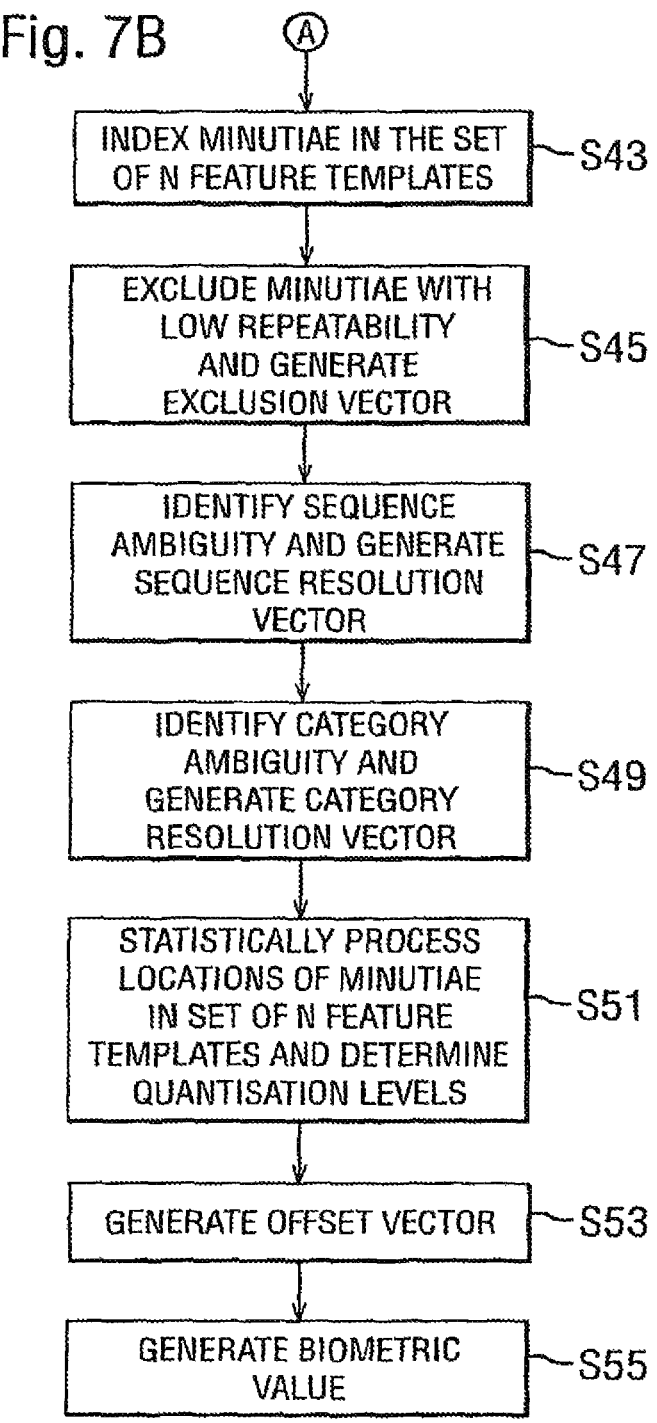

DATA PROCESSING APPARATUS AND METHOD

CROSS REFERENCE TO PRIOR APPLICATIONS

This application is a continuation of pending U.S. application Ser. No. 10/467,831, filed on Aug. 13, 2003, which is a national stage application of PCT International Application No. PCT/GB02/00626, filed on Feb. 14, 2002, which claims priority to Great Britain Patent Application Nos. 0103656.5, filed on Feb. 14, 2001, 0113255.4, filed May 31, 2001, 0113254.7, filed May 31, 2001, and 0119464.6, filed on Aug. 9, 2001, each of which are hereby incorporated by reference in their entireties.

This invention relates to the generation of a cryptographic key using data from an analogue source. The invention has particular, but not exclusive, relevance to generating a cryptographic key using biometric data obtained by scanning a fingerprint, an iris, a retina or the like. The invention also provides a method of generating a number representative of data from an analogue source, and an apparatus therefor, which has applications outside of the field of cryptography.

BACKGROUND

Encryption/decryption systems generally rely upon one or more cryptographic keys. In a symmetric encryption system, for example the DES (Data Encryption Standard) system, the same cryptographic key is used to encrypt and decrypt data, while in an asymmetric encryption system, for example the RSA (Rivest-Shamir-Adelman) system, different cryptographic keys are used for encryption and decryption. In an asymmetric encryption system, typically a pair of cryptographic keys are generated of which one, known as the private key, is kept secret while the other, known as the public key, is publicly available.

It is important that the cryptographic key used in a symmetric encryption system or the private key used in an asymmetric encryption system is known only by authorised personnel or devices. However, the cryptographic keys employed are typically large numbers which are difficult for a person to memorise and therefore a permanent record of the cryptographic key is generally made. This raises the problem of security of the permanent record.

The RSA algorithm generates the public and private key using a random seed number. German patent application DE 4243908A1 describes using a biometric value calculated from a biometric attribute of a person, for example a fingerprint, as the random seed number. In this way, there is no requirement to maintain a permanent record of the private key because it can be generated whenever needed by scanning the fingerprint of the person. DE 4243908A1 does not, however, describe how to generate a repeatable biometric value from an analogue data source such as a fingerprint.

A problem with the encryption system described in DE 4243908A1 is that the biometric value is uniquely associated with a private key and therefore if the private key is discovered, then the security of the encryption system is irrevocably lost. International patent publication WO 98/48538 addresses this problem and describes an encryption system in which biometric data is processed by a filter to generate directly a private key for the RSA algorithm, enabling the generated private key to be changed by using a different filter. In order to be able to generate a repeatable private key from the biometric data, for each bit of the private key the filter compares a number of binary digits, generated from the biometric data, which should be identical, and selects the binary digit which appears most often.

The present inventors have recognised that a problem with the system described in WO 98/48538 is that by constraining the repeatable number generated from the biometric data to be equal to a private key, part of the inherent randomness (sometimes called entropy) of the biometric data is sacrificed. This results in a reduction in the entropy of the generated private key.

Those skilled in the art will appreciate that it is desirable for the private key to have as much entropy as possible because this increases the difficulty of cryptoanalysing an encrypted message by trying all possible private keys.

SUMMARY

According to a first aspect of the invention, there is provided an apparatus for generating a predetermined cryptographic key, the apparatus comprising means for processing received data which is representative of an analogue source to generate an intermediate key, and means for combining the intermediate key and a stored mapping key using a monotonic mapping function to form the cryptographic key. In this way, it is not necessary to maintain a permanent record of the cryptographic key. Although the mapping key is stored, by itself the mapping key gives no information about the cryptographic key. Further, it is not necessary to constrain the intermediate key to a particular value and therefore a greater portion of the entropy of the data from the analogue source can be transferred to the cryptographic key.

Preferably, the data from the analogue source is biometric data generated from a characteristic of an individual, for example a fingerprint or an iris, because generally the cryptographic key can then only be generated in the presence of the individual. This is not, however, essential and in the alternative the analogue source could be, for example, a picture or a sound recording.

It is preferable that the level of repeatability of the intermediate key generated from the analogue source is as high as possible, so that the correct cryptographic key is generated as frequently as possible.

According to a second aspect of the invention, there is provided an apparatus for generating a number from data representative of an analogue source, the apparatus comprising means for processing, in accordance with stored processing instructions predetermined by a training process, the data to identify at least one attribute of at least one feature within the data and determine an attribute value for the or each identified attribute, and means for generating the number from the at least one attribute value. The training process enables the processing instructions to be determined in accordance with desired criteria. In an embodiment, the training process determines processing instructions to achieve a desired level of repeatability.

The processing instructions could affect either or both of the way attributes are identified and the way values are assigned to identified attributes.

DRAWINGS

Various embodiments of the invention will now be described with reference to the accompanying figures, in which:

FIG. 6 is a flowchart showing operations performed by the cryptography unit illustrated in FIG. 3 when enrolling a new user;

Figure 3:
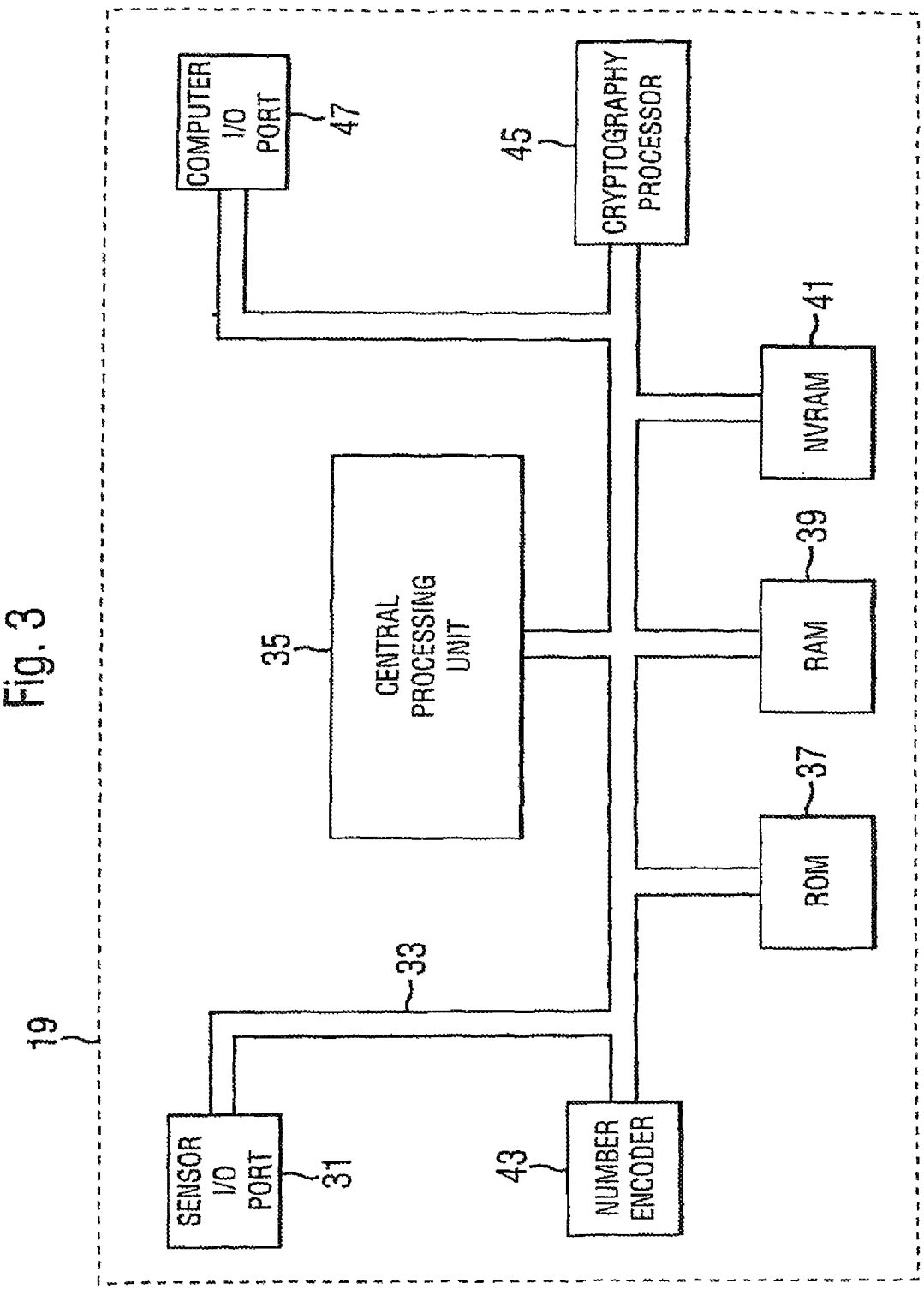
FIG. 3 is a schematic block diagram showing the main components of the cryptography unit illustrated in FIG. 1.
Figure 7A:
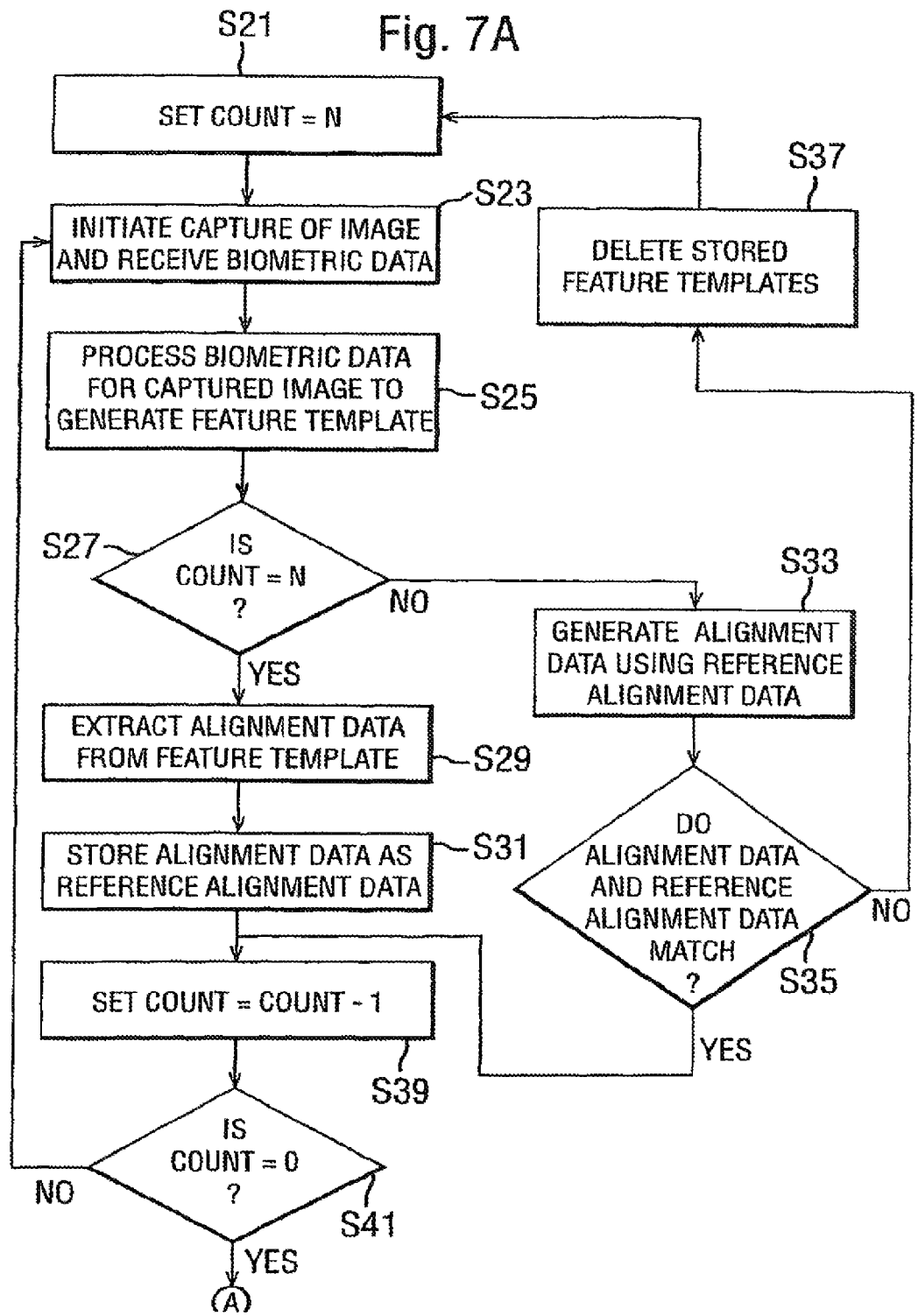
Figure 8:
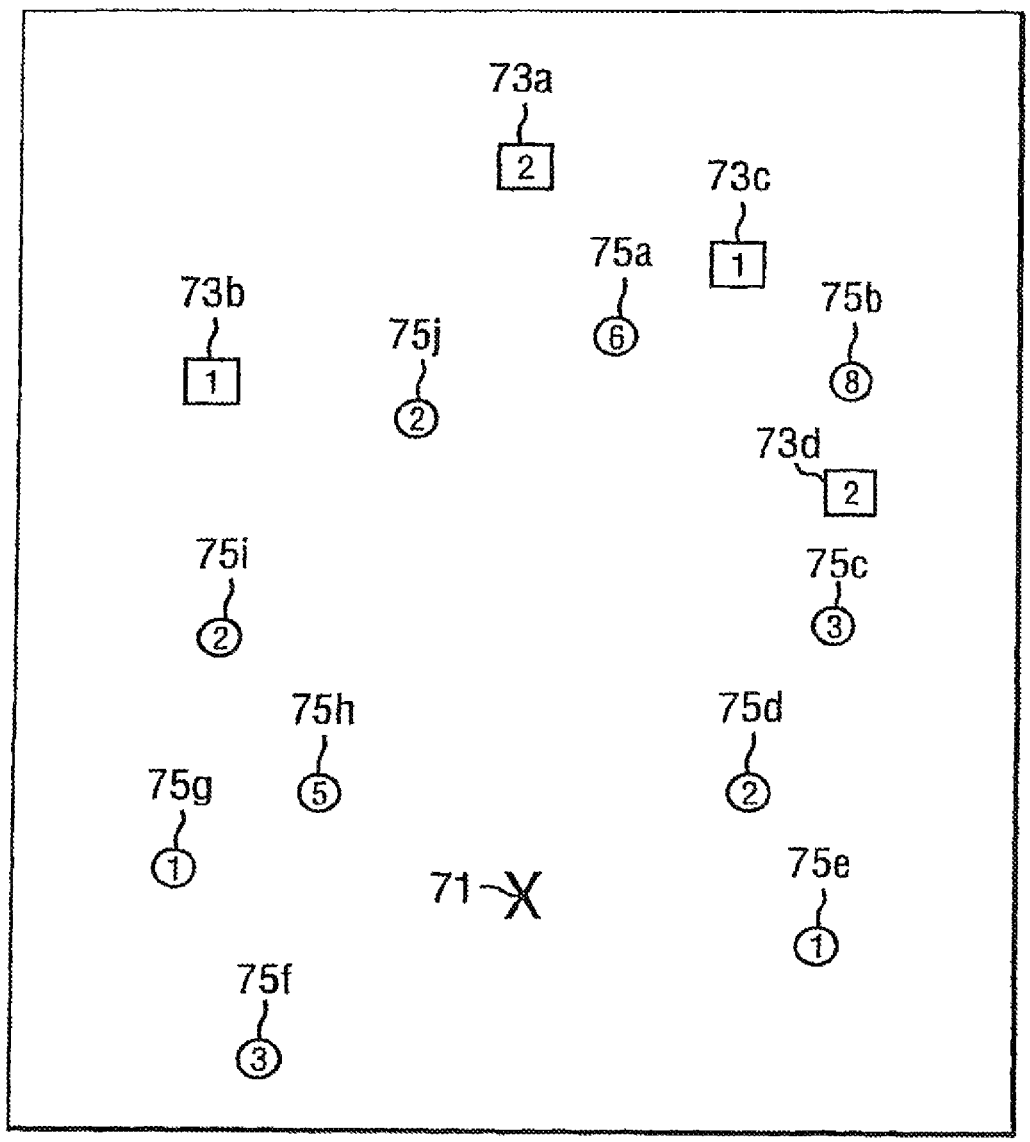
Figure 9:
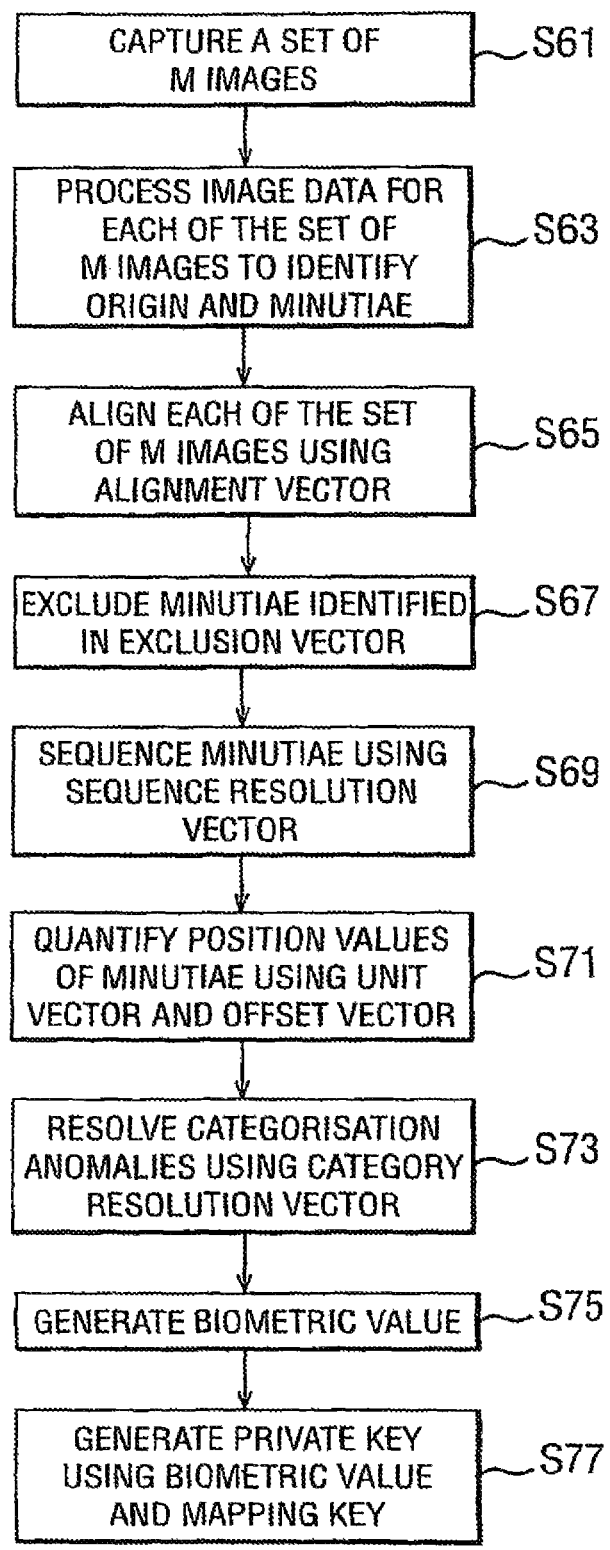
Figure 10:
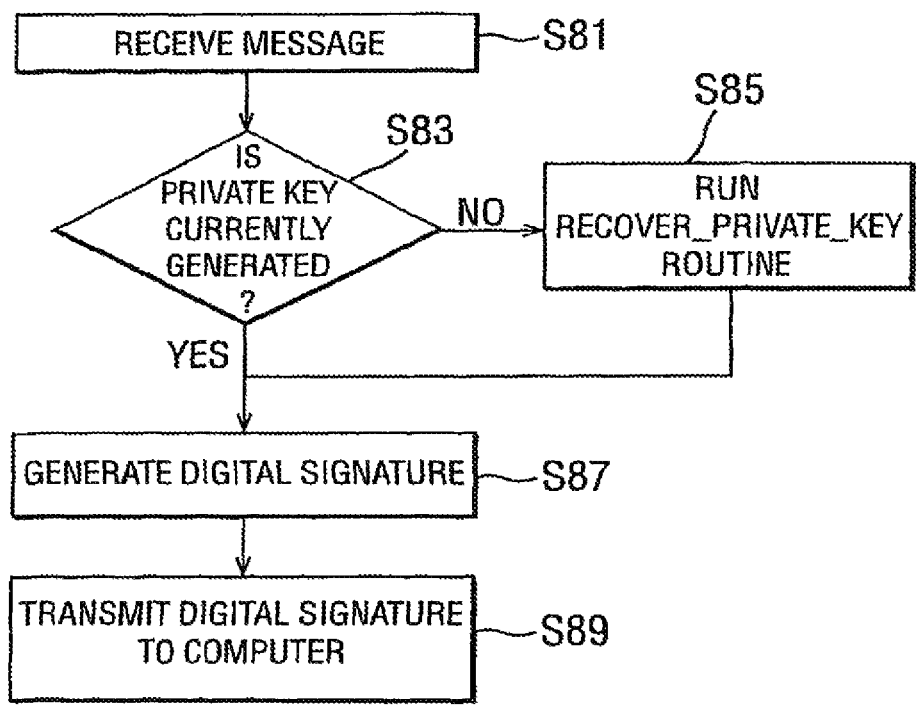
Figure 11:
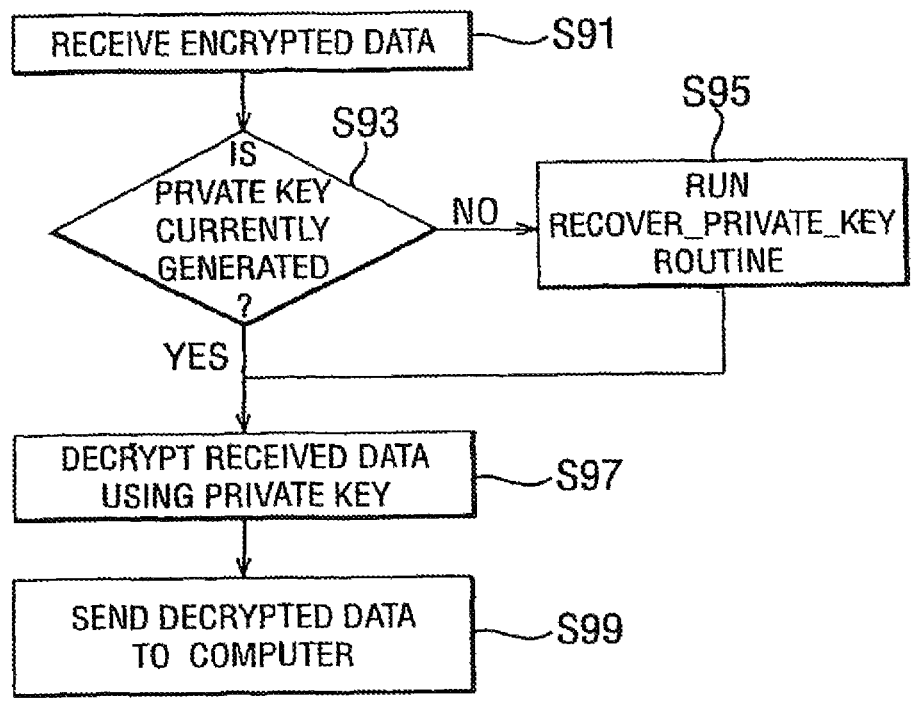
Figure 12:
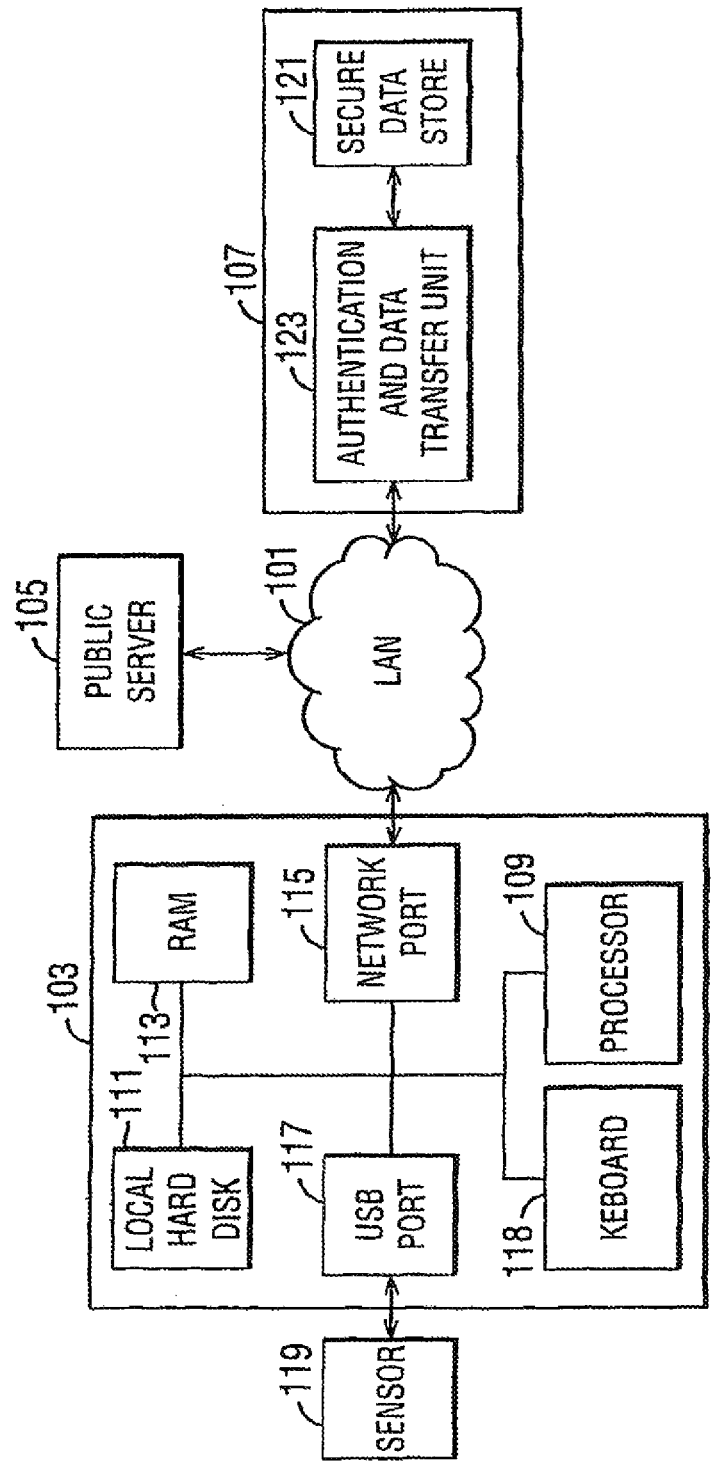
Figure 13:
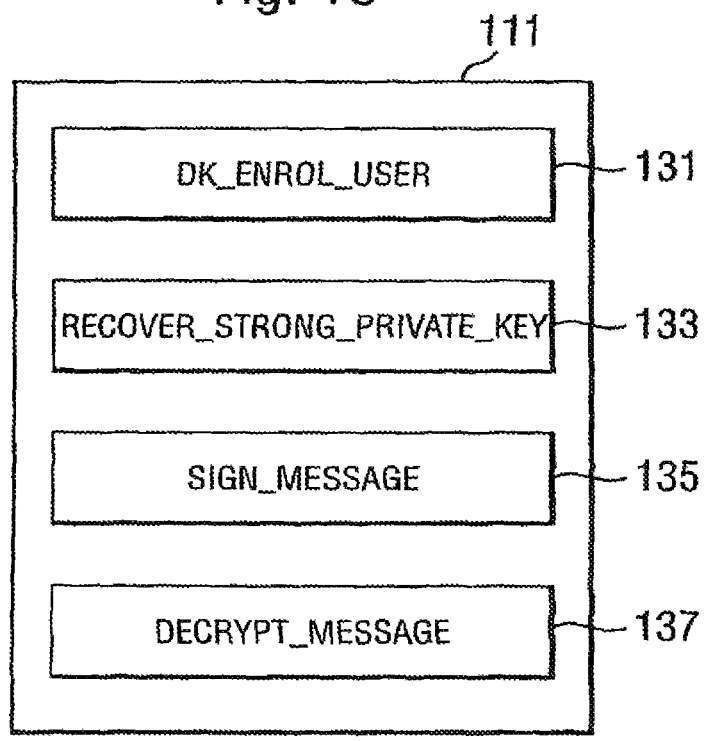
Figure 14:
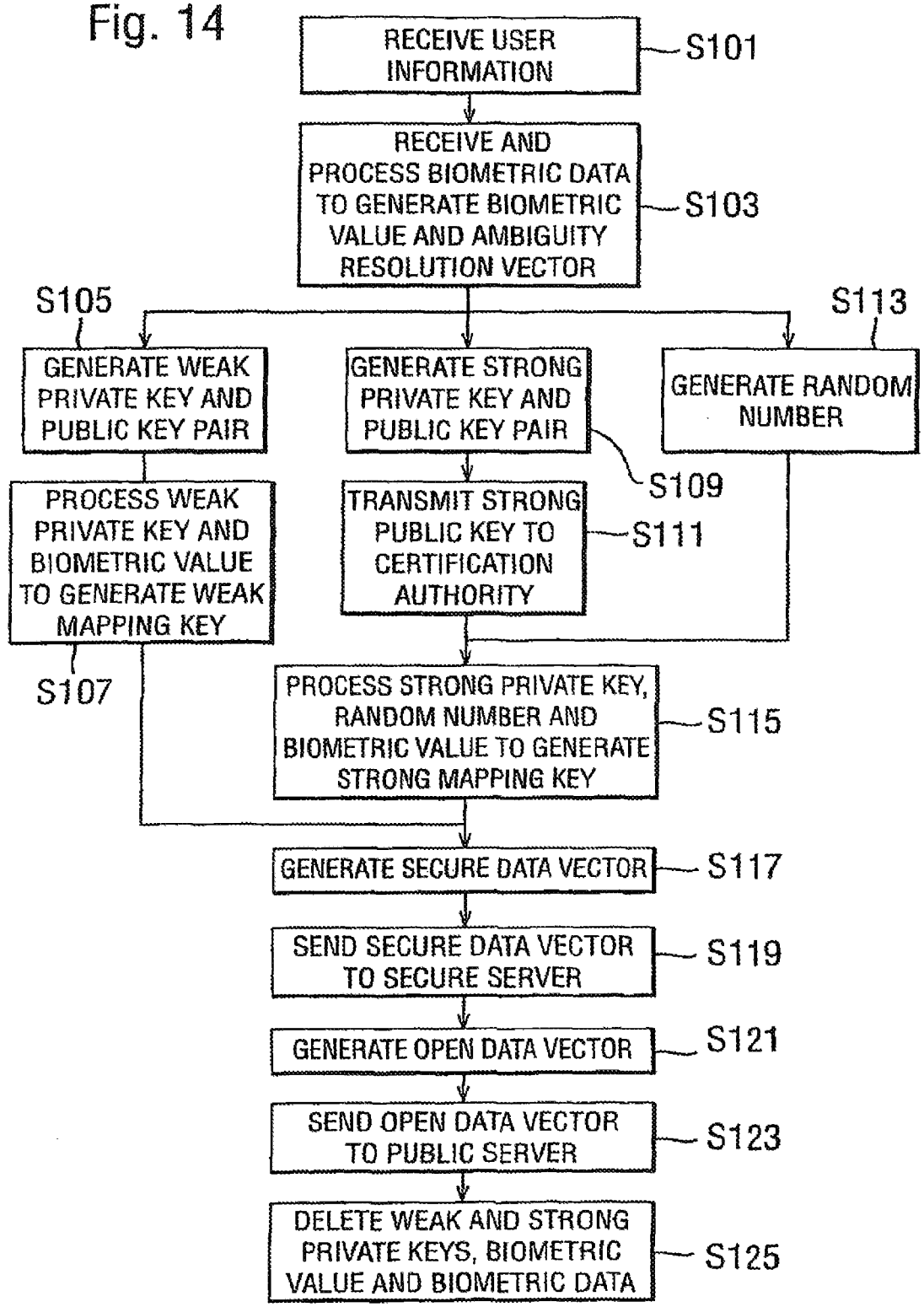
Figure 15:
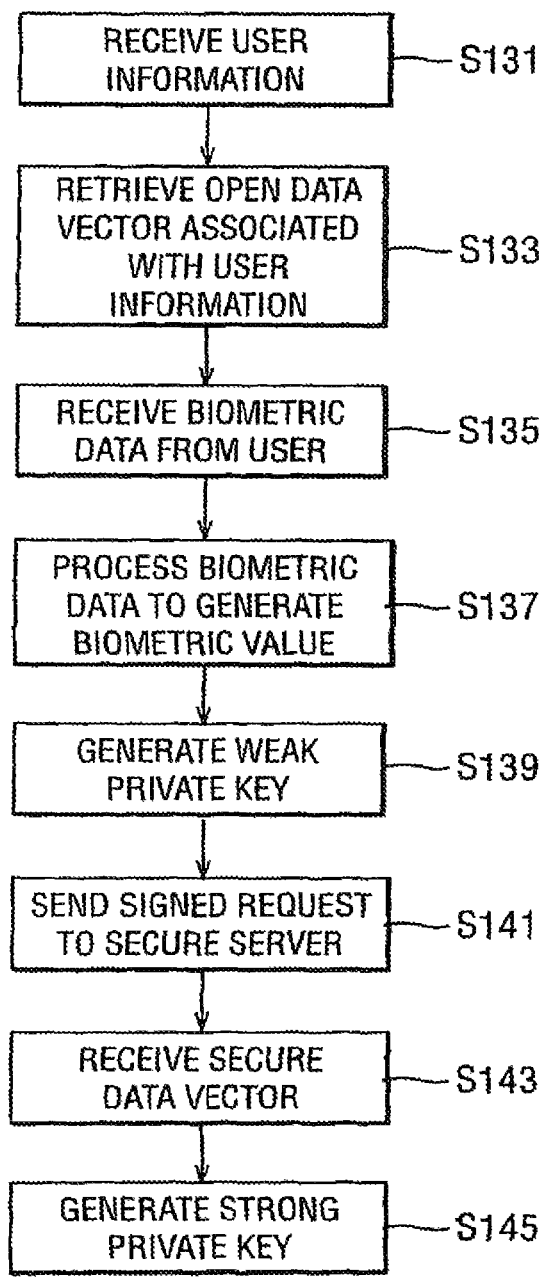

FIGS. 7A and 7B form a flowchart which shows in more detail how biometric data from a new user is processed to generate a biometric value and an ambiguity resolution vector during the enrolling routine illustrated in FIG. 6;

FIG. 8 is a schematic diagram illustrating a feature template generated during enrolment of a new user;

FIG. 9 is a flowchart showing the main operations performed by the cryptography unit illustrated in FIG. 3 when recovering a cryptographic key from biometric data associated with an enrolled user;

FIG. 10 is a flowchart showing the main operations performed by the cryptography unit illustrated in FIG. 3 when verifying the identity of an enrolled user;

FIG. 11 is a flowchart showing the main operations performed by the cryptography unit illustrated in FIG. 3 when encrypting data using the cryptographic key derived using biometric data from an enrolled user;

FIG. 12 schematically shows a computer network including a computer terminal connected to a fingerprint sensor, a public server and a secure server;

FIG. 13 is a schematic block diagram showing routines stored in a ROM forming part of the computer terminal illustrated in FIG. 12;

FIG. 14 is a flowchart showing the main operations performed by the computer terminal illustrated in FIG. 12 in order to enrol a new user; and FIG. 15 is a flowchart showing the main operations performed by the computer terminal illustrated in FIG. 12 to recover a cryptographic key from biometric data associated with an enrolled user.

DESCRIPTION

Figure 1:
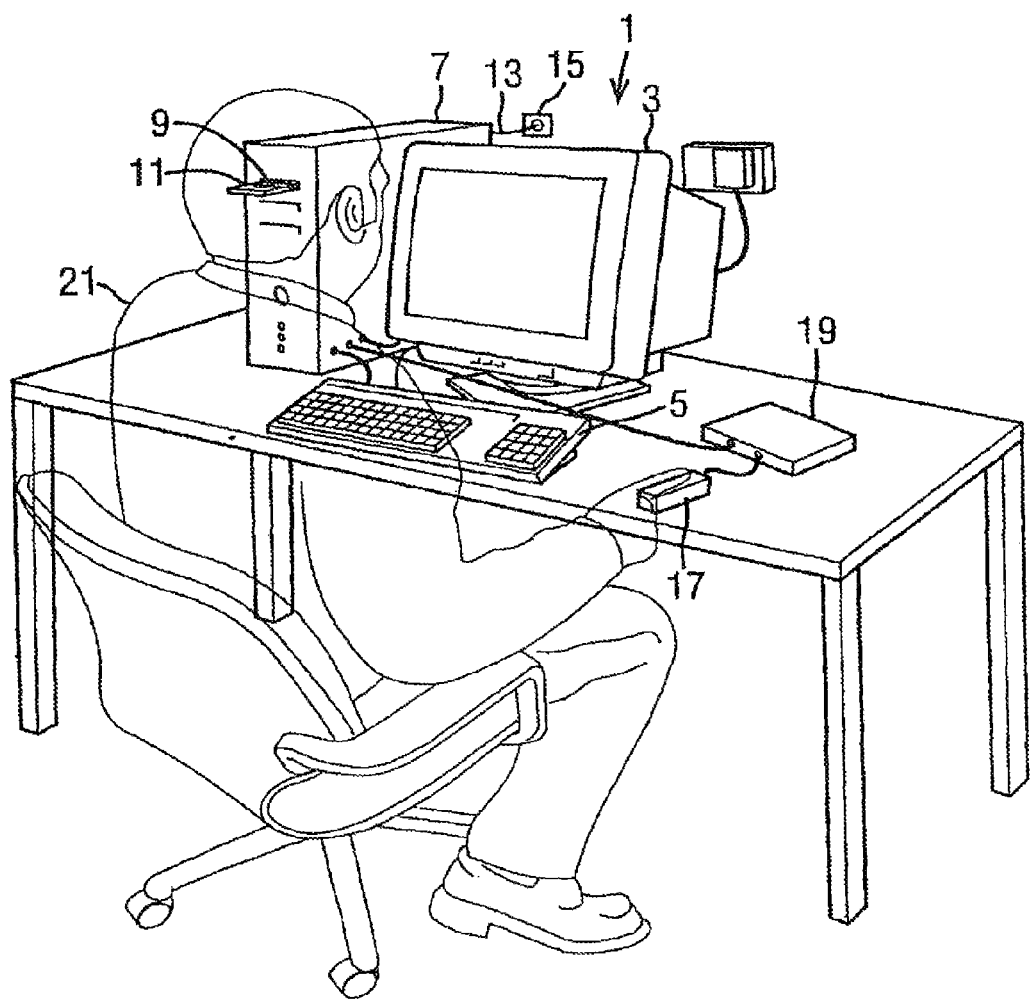
FIG. 1 shows a computer system including a fingerprint sensor and a cryptography unit.

FIG. 1 shows a computer 1 having a display 3, a keyboard 5 and a computer tower 7 which includes a slot 9 for receiving a floppy disk 11. The computer tower 7 includes a modem (not shown) which is connected, via a cable 13, to a telephone socket 15 to allow access to the Internet. A fingerprint sensor 17, which in this embodiment includes an ATMEL thermal sensing chip, is connected to a cryptographic unit 19 which is in turn connected to the computer tower 7.

Figure 2:
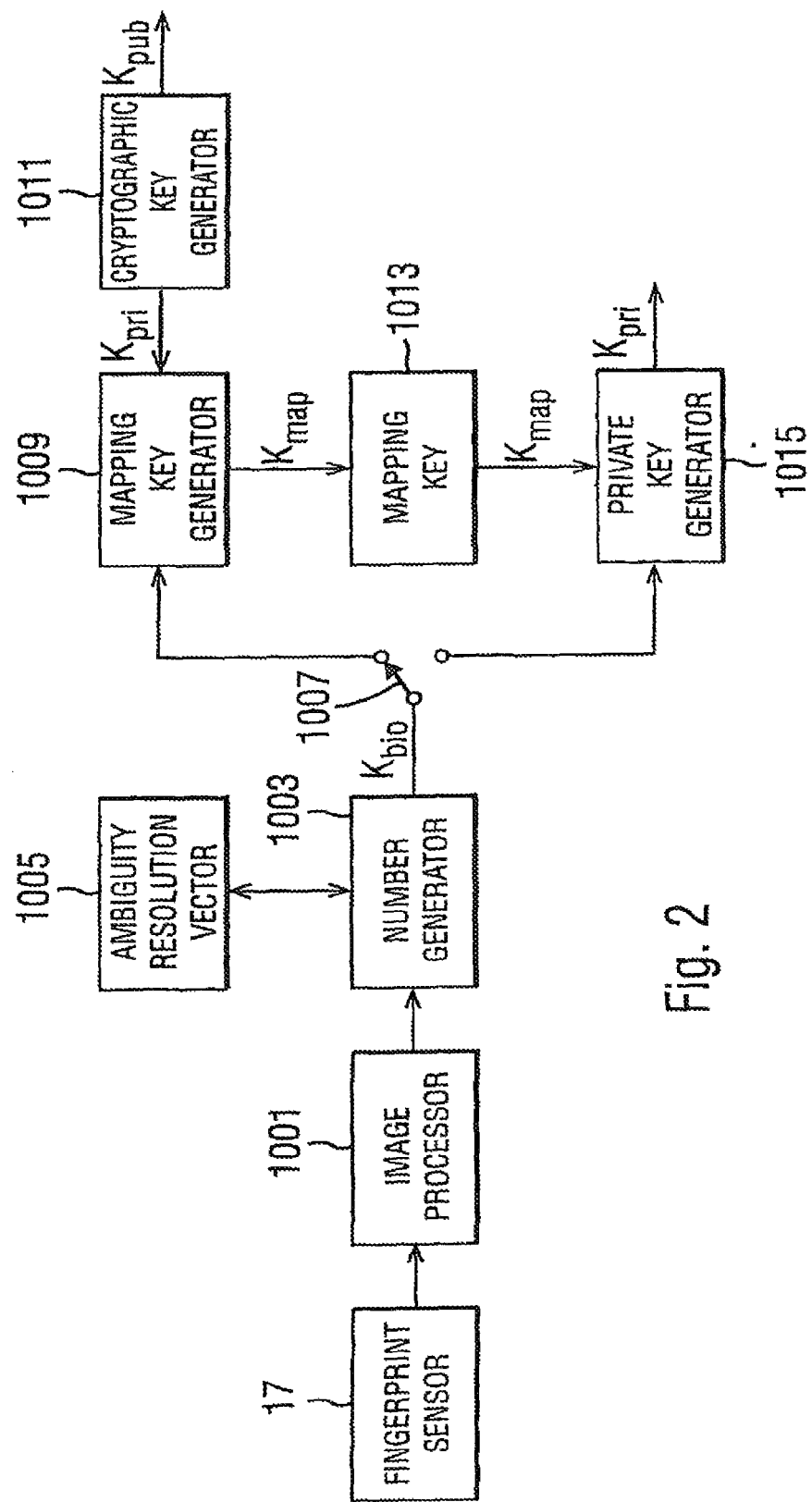
FIG. 2 is a schematic block diagram showing how data from the fingerprint sensor is processed by the cryptography unit illustrated in FIG. 1 to generate a mapping key or a cryptographic key.

FIG. 2 schematically shows how the cryptography unit 19 is configured to generate a biometric value $K_{bio}$ from the image data representative of the fingerprint of the user 21 and to use the generated biometric value $K_{bio}$ to generate either a mapping key $K_{map}$ or a cryptographic key $K_{pri}$. As shown, data from the fingerprint sensor 17 is input to an image processor 1001 which processes the data to form a feature template representative of features within the fingerprint. The feature template is then input to a number generator 1003.

When enrolling a new user, the number generator 1003 processes one or more feature templates representative of the fingerprint of the new user and determines processing instructions and process variables which improve the repeatability of a generated biometric value $K_{bio}$. These processing instructions and process variables are stored as an ambiguity resolution vector 1005. A switch 1007 then directs the biometric value $K_{bio}$ to a mapping key generator 1009, and a cryptographic key generator 1011 generates a private key $K_{pri}$ and public key $K_{pub}$ pair, of which the public key $K_{pub}$ is sent to a certifying authority and the private $K_{pri}$ is input to the mapping key generator 1009. The biometric value $K_{bio}$ and the private key $K_{pri}$ are used by the mapping key generator 1009 to generate a mapping key $K_{map}$, using a monotonic mapping function, and the mapping key $K_{map}$ is stored in a mapping key store 1013.

After enrolment, when a user wishes to generate the private key $K_{pri}$, the fingerprint sensor 17 scans the fingerprint of the user and sends image data to the image processor 1001, which generates one or more feature templates. The number generator 1003 processes the one or more generated feature templates, Using the processing instructions stored in the ambiguity resolution vector store 1005, to generate the biometric value $K_{bio}$ and the switch 1007 directs the biometric value $K_{bio}$ to a private key generator 1015. The biometric value $X_{bio}$ and the mapping key $K_{map}$ are combined by the private key generator 1015, using the monotonic mapping function, to generate the private key $K_{pri}$.

The cryptographic unit 19 is then able, for example, to create a digital signature using the private key $K_{pri}$ or to decrypt a message received from the computer 1 using private key $K_{pri}$.

FIG. 3 schematically shows the main components of the cryptography unit 19. As shown, the cryptography unit 19 has a sensor input/output port 31 for receiving data from and transmitting instructions to the fingerprint sensor 17. The sensor input/output port 31 is connected, via a data bus 33, to a central processing unit (CPU) 35, a read only memory (ROM) 37, a random access memory (RAM) 39, a non-volatile random access memory (NVRAM) 41 and a computer input/output port 47 for receiving data from and transmitting data to the computer 1. The central processing unit 35 coordinates the operation of the cryptography unit 19. The bus 33 is also connected to a number encoder 43, which is configured to generate the biometric value $K_{bio}$ from received data from the fingerprint sensor 17, and a cryptography processor 45, which is configured to perform any required cryptographic operations.

In this embodiment, the cryptography processor 45 is capable of generating the private key $K_{pri}$ and the public key $K_{pub}$ pair using the RSA algorithm.

Figure 4:
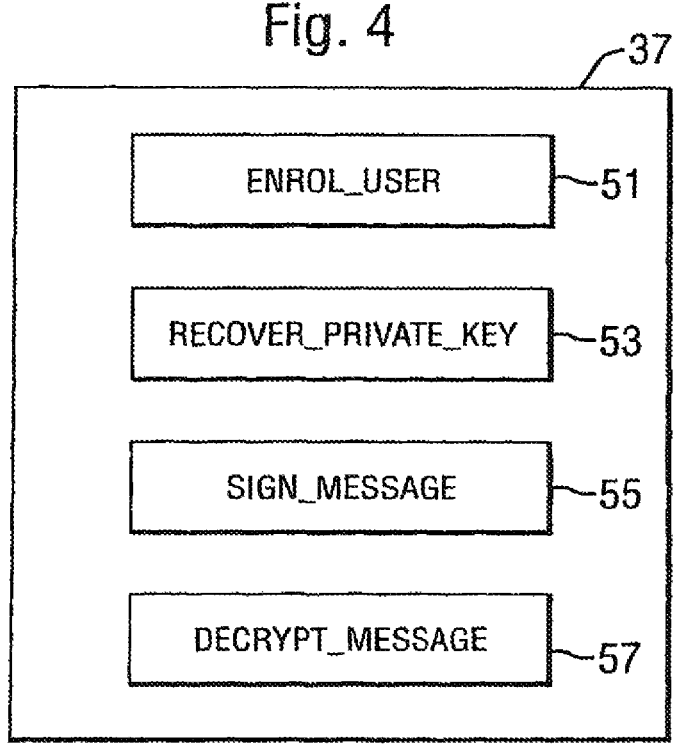
FIG. 4 is a schematic block diagram showing routines stored in a read only memory forming part of the cryptography unit illustrated in FIG. 3.

The ROM 37 stores a number of routines which are used during operation of the cryptography unit 19, four of which are shown in FIG. 4. An ENROL_USER routine 51 is used to process image data corresponding to the fingerprint of a new user 21 to generate the biometric value $K_{bio}$, and subsequently to generate a mapping key $K_{map}$ which when combined with the generated biometric value $K_{bio}$ using a mapping function generates the private key $K_{pri}$ for the user 21. A RECOVER_PRIVATE_KEY routine 53 enables the private key $K_{pri}$ associated with a user to be recovered by applying a mapping function to the biometric value $K_{bio}$ generated from the image data for the fingerprint of the user 21 and the mapping key $K_{map}$. A SIGN_MESSAGE routine 55 is used to generate a digital signature, using the private key $K_{pri}$ generated for a user, in order to authenticate the source and integrity of a message. A DECRYPT_MESSAGE routine 57 is used to decrypt, using the private key $K_{pri}$ for the user 21, messages encoded with the associated public key $K_{pub}$.

Figure 5:
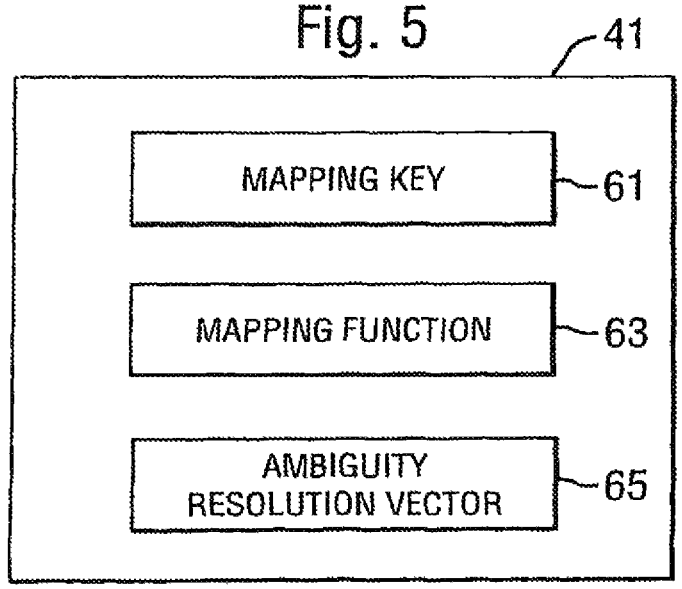
FIG. 5 is a schematic block diagram showing the contents of a non-volatile random access memory which forms part of the cryptography unit illustrated in FIG. 2.

FIG. 5 shows data stored in the NVRAM 41 after the ENROL_USER routine 51 has been run. As shown, the NVRAM 41 stores the mapping key 61 generated by the ENROL_USER routine 51, the mapping function 63 and an ambiguity resolution vector (ARV) 65 which, as will be described in detail hereafter, is used when processing the image data to generate a biometric value $K_{bio}$ in order to improve the repeatability of the generated biometric value $K_{bio}$.

The four routines illustrated in FIG. 4 will now be described in greater detail.

A flow chart showing an overview of the ENROL_USER routine is shown in FIG. 6. The cryptography unit 19 receives, in step S1, biometric data from the fingerprint scanner 17 via the sensor I/O port 31 and processes the received biometric data to generate the biometric value $K_{bio}$ and the ambiguity resolution vector.

A fingerprint image consists of a pattern of ridges with the smooth flow of the ridges being interrupted by discontinuities referred to as minutiae. These minutiae have been codified into different types which are generally known as Galton features. The positions of the minutiae in a fingerprint vary little over an individual's life, apart from scarring or the like, and are sufficiently random that they have been used for many years to identify an individual. Table 1 names and gives a brief description of the eight categories used in this embodiment.

TABLE 1

Categories of fingerprint minutiae.

| CATEGORY NUMBER | NAME | BRIEF DESCRIPTION |
|---|---|---|
| 1 | Ridge Ending | The point at which a ridge stops |
| 2 | Bifurcation | The point at which one ridge divides into two |
| 3 | Dot | Very small ridge |
| 4 | Island | Ridge slightly longer than a dot located between two temporarily divided ridges |
| 5 | Pond | Empty space between two temporarily divergent ridges |
| 6 | Spur | A notch protruding from a ridge |
| 7 | Bridge | Small ridge connecting two longer adjacent ridges |
| 8 | Crossover | Two ridges which cross each other |

The processing performed to generate the biometric value $K_{bio}$ and the ambiguity resolution vector will be described in more detail hereinafter.

The generation of a public key $K_{pub}$ and a private key $K_{pri}$ pair using the RSA algorithm is then performed, in step S3, using the cryptography processor 45. The generated public key $K_{pub}$ is transmitted, in step S5, to the certification authority by transmitting the public key $K_{pub}$, via the computer I/O port 47, to the computer 1 which in turn transmits the public key $K_{pub}$, via the Internet, to the certification authority. In this way, third parties have access to the public key $K_{pub}$.

The CPU 35 then processes, in step S7, the private key $K_{pri}$ and the biometric value $K_{bio}$ to generate the mapping key $K_{map}$. In this embodiment, the private key $K_{pri}$ is a 128 bit binary number and the mapping key $K_{map}$ is generated by subtracting the biometric value $K_{bio}$ from the private key $K_{pri}$ as shown in equation 1.

$$K_{map} = K_{pri} - K_{bio} \quad (1)$$

The ambiguity resolution vector and the mapping key $K_{map}$ are then stored, in step S9, in the NVRAM 41 for subsequent use by the RECOVER_PRIVATE_KEY routine 53. The ENROL_USER routine then concludes by deleting, in step S13, the private key $K_{pri}$, the biometric value $K_{bio}$ and the biometric data. Therefore, after the ENROL_USER routine has been completed, the private key $K_{pri}$ is not stored anywhere in the cryptography unit 19 and can only be regenerated when new biometric data corresponding to the fingerprint of the user 21 is received and processed to regenerate the biometric value $K_{bio}$. The mapping key $K_{map}$, which is stored in the cryptography unit 19, by itself gives no information concerning the private key $K_{pri}$.

The process by which the biometric value $K_{bio}$ and the ambiguity resolution vector are generated from the biometric data will now be described. In this embodiment, each minutia has three attributes (i.e. category, normalised distance r and angle θ) for which values are measured and the measured attribute values are concatenated in order to form a single value representative of the minutia, which will hereafter be called the feature value. The biometric value $K_{bio}$ is then formed by concatenating the feature values for multiple minutiae.

To enable repeatable generation of the biometric value $K_{bio}$ from different images of the fingerprint, the minutiae need to be reliably indexed in the same order so that they are concatenated in the same order. Further, the category and the (r,θ) co-ordinates need to be reliably calculated so that the feature value for a minutia does not vary. The ambiguity resolution vector contains process instructions and variables which are used to improve the repeatability of the biometric value $K_{bio}$.

In this embodiment, the ambiguity resolution vector consists of:

1. an alignment vector storing reference alignment data which enables alignment of different images of a fingerprint;
2. an exclusion vector which indicates minutiae which should be excluded because they cannot be reliably detected;
3. a sequence resolution vector which reduces the likelihood of the minutia being indexed in the wrong order;
4. a category resolution vector which reduces the likelihood of a minutia being wrongly categorised;
5. a unit size vector which indicates for each minutia the spacing between the quantisation levels for the normalised distance r and the angle θ;
6. an offset vector which stores offset values for adjusting the normalised distance r and angle θ for each minutia to be approximately midway between quantisation levels; and
7. encoding data which provides more general information about how the feature template should be processed.

The category resolution vector, unit value vector and offset vector each store values associated with individual features. In this embodiment, for each minutia the values of the category resolution vector, unit value vector and offset vector are grouped together to form a feature vector.

The process of generating the biometric value $K_{bio}$ and the ambiguity reference vector will now be described with reference to FIGS. 7A, 7B and 8.

Firstly, a count value is set, in step S21, to N where N is the number of images which are to be processed in order to generate the biometric value $K_{bio}$ and the ambiguity resolution vector. The cryptography unit 19 then initiates, in step S23, capture of an image by the fingerprint sensor 17 and receives the image data for the captured image. In this embodiment, the image data received from the fingerprint sensor 17 is first thinned to provide more distinct ridges. Such a thinning operation is conventional in automatic fingerprint processing systems. The image data is then processed using conventional pattern recognition software to locate minutiae in the eight categories identified in Table 1.

The image data is also processed to locate, again using conventional pattern recognition software, the point of maximum ridge curvature which acts as an origin from which the positions of all the other identified minutiae are measured. A feature template is then formed by data representing the origin and the identified minutiae.

The cryptography unit 19 then checks, in step S27, the count value. If the count value is equal to N, the number encoder 43 identifies, in stop S29, four prominent minutiae, usually ridge endings or bifurcations, to act as alignment minutiae. In particular, a principal minutia 73$a$ is identified by looking in a predetermined region of the image and three secondary minutiae 73$b$, 73$c$, 73$d$, are identified by looking in different regions of the image spaced away from each other and the principal minutia 73$a$.

FIG. 8 schematically shows a feature template in which the origin 71 has been represented by a X, each alignment minutia 73 has been represented by a square enclosing the category number for the minutia, and each of the remaining minutiae, which will be referred to as measurement minutiae 75, have been represented by a circle enclosing the category number for the minutia.

A principal axis is then formed by a line connecting the origin 71 and the principal minutia 73$a$. The distance between the origin 71 and the principal minutia 73$a$ is used as a normalisation distance R, and the positions of the other alignment minutiae 73 and the measurement minutiae 75 are then determined using polar coordinates $(r,\theta)$, where for each minutia r is the distance of the minutia from the origin 71 normalised by the normalisation distance R, and $\theta$ is the angle between the principal axis and a straight line extending from the origin 71 to the minutia.

The cryptography unit 19 then stores in step S31, the absolute positions and categorisations of the alignment minutiae 73 for use as reference alignment data. The purpose of storing the absolute positions in categorisations of the alignment minutia 73 are to facilitate the identification of the corresponding minutia in subsequent feature templates. If the count value is not equal to N, then this indicates that reference alignment data has already been stored, and alignment data for the new feature template is generated, in step S33, using the reference alignment data. In particular, minutia are identified which are in the vicinity of the absolute positions stored in the reference alignment data and whose category matches the category of the corresponding minutia of the reference alignment data. This relies upon the fact that there is a natural orientation in which a user places a finger on the fingerprint sensor and therefore the positions of the alignment minutiae will not vary to a large extent from one image scan to the next.

The cryptography unit 19 then compares, in step S35, the alignment data generated for the new feature template with the reference alignment data. This comparison involves comparing the $(r,\theta)$ co-ordinates of all but one of the secondary minutia for the new alignment data with the corresponding secondary minutia of the reference alignment data to identify image distortion, which may be caused by a change in orientation of the finger between different scans of the fingerprint. A transform function is then determined based on these differences to transform the r and $\theta$ values of the new secondary minutiae so that they align with the corresponding secondary minutiae of the reference alignment data. Finally, the determined transform function is applied to the $(r,\theta)$ co-ordinates for the last remaining secondary minutia and the transformed co-ordinates are compared with the $(r,\theta)$ co-ordinates for the corresponding secondary minutiae of the reference alignment data to check whether they coincide. In particular, if the normalised distance between transformed $(r,\theta)$ co-ordinates for the last remaining secondary minutia and the $(r,\theta)$ co-ordinates for the corresponding reference secondary minutia exceeds a preset amount, this indicates that at least one of the stored feature templates is unreliable and therefore the routine proceeds to delete, in step S37, all the stored feature templates and returns to step S21 in which the count value is reset to N, otherwise the determined transform is applied to the $(r,\theta)$ co-ordinates of the measurement minutiae 75.

After either the alignment data has been stored as the reference alignment data (step S31) or the alignment data has been found to match the reference alignment data (step S35), the cryptography unit 19 decrements, in step S39, the count value by 1 and then checks, in step S41, if the count value is equal to 0. If the count value is not equal to 0, then the routine returns to step S23 where a new image is captured. If the count value is equal to 0, then this indicates that N feature templates have successfully been stored and the analysis of the measurement minutiae 75 commences.

The analysis begins by indexing, in step S43, the minutiae in each of the N feature templates. In particular, for each feature template the minutiae are primarily indexed in the order of increasing value of $\theta$. If two or more minutiae have the same value of $\theta$, then these two or more minutiae are indexed in increasing value of r.

The minutiae of each of the N feature templates are compared, in step S45, and any minutiae with a low repeatability are excluded. In particular, minutiae which do not appear in all of the N feature templates and minutiae which have been classified in more than two categories throughout the set of N feature templates are excluded. The exclusion vector giving details of the excluded minutia is then generated and stored as part of the ambiguity resolution vector. The exclusion vector lists the $(r,\theta)$ coordinates for the excluded minutiae so that, when processing subsequent fingerprint scans, minutiae at these co-ordinates are ignored.

The minutiae of each feature template are then indexed. A problem which can occur when indexing the minutiae is that if two or more minutiae have very similar values of $\theta$, then the order in which these two or more minutiae are indexed can vary between different feature templates. In order to allow for this, sources of possible sequence ambiguity are identified, in step S47, and the sequence resolution vector is generated. In particular, minutiae whose values of $\theta$ are within a determined amount $\Delta\theta$ from each other are grouped together and a secondary indexing rule, which is stored in the encoding data of the ambiguity resolution vector, is applied. In this embodiment, the secondary indexing rule is that the minutiae in each group are indexed in the order of increasing r. The sequence resolution vector is then formed by clusters of index numbers, each cluster identifying the index numbers for a group of minutiae which are to be re-indexed in order of increasing r. For example, if it is found that the values for $\theta$ for minutiae with index numbers 6, 7 and 8 are within $\Delta\theta$ of each other, the sequence resolution vector stores a cluster identifying the index values 6, 7 and 8.

Now that the minutiae have been indexed, each minutia is individually investigated to determine the corresponding feature vector.

Although minutiae which have been classified in more than two categories have already been excluded (step S45), minutiae which have been classified in two different categories are still included. This category ambiguity is identified, in step S49, and the category resolution vector is generated. In particular, an order of precedence of the categories is preset, and stored in the encoding data of the ambiguity resolution vector, and for each minutia whose category is ambiguous it is determined whether the category which is higher or lower in the order of precedence is to be used. In this embodiment, this assignment is performed based on which category was assigned to the minutia in the majority of the N feature templates. The category resolution vector for the minutia is then generated by storing in the corresponding feature vector a value indicating whether or not the higher or lower category in the order of precedence is to be used in case of ambiguity.

The normalised distance r and the angle θ for each minutia are then processed to generate respective values. In this embodiment, a three-step process is performed for each minutia.

Firstly, the normalised distance r for the minutia is statistically compared over the N feature templates to determine the standard deviation of the measured values. A confidence interval, corresponding to a predetermined confidence level, is then calculated using conventional statistical analysis of the standard deviation. In this embodiment, the confidence interval is the range of normalised distance r within which, based on the determined standard deviation, 99% of measurements would fall. A quantisation unit Q, corresponding to the spacing between neighbouring ones of a series of quantisation levels, is then set equal to this confidence interval. In this way, if the mean value of the normalised distance r is midway between two neighbouring quantisation levels then there is a 99% probability that the value of the normalised distance r for a subsequent fingerprint image will fall within the neighbouring quantisation levels. It will be appreciated that the quantisation levels are closer together for a relatively low standard deviation than for a relatively high standard deviation. The same procedure is than performed for the angle θ to determine corresponding quantisation levels, and the resulting quantisation unit sizes for the normalised distance r and the angle θ are stored in the feature vector. The normalised distance r and the angle θ are then divided by the corresponding quantisation unit to generate quantised values of the distance r and the angle θ.

Secondly, offset values are determined for the quantised values of the distance r and angle θ which, when added to the quantised values, place the quantised values approximately midway between two neighbouring quantisation levels. For example, if the statistical analysis indicates, that a quantisation level should occur every quarter of the normalisation distance (i.e. there are quantisation levels at 0.25, 0.5, 0.75 . . . ), then if the mean value of the normalisation distance r is 0.272, a quantised value is calculated by dividing the normalised distance r by 0.25 to give 1.088. An offset value of is then calculated by truncating the quantised value (to give a value of 1), adding 0.5 (to give a value of 1.5) and subtracting the quantised value to give an offset value of 0.412. Similarly, if the mean value of the normalisation distance r is 0.241 then an offset value is then calculated by truncating the quantised value, i.e truncating 0.964 to give 0, adding 0.5 and subtracting the quantised value. The offset values for the normalised distance r and angle θ and then stored as components of the feature vector for the minutia.

Finally, the cryptography unit 19 generates, in step S55, the biometric value $K_{bio}$. In particular, for each measurement minutia 75 the category value and the quantised values for the normalised distance r and the angle θ are concatenated to form a feature value, and the feature values for each of the measurement minutiae 75 are then concatenated in order of index number to form the biometric value $K_{bio}$.

The RECOVER_PRIVATE_KEY routine 53 will now be described with reference to FIG. 9. As has been described previously, after the ENROL_USER routine has been executed the mapping key $K_{map}$ 61, the mapping function 63 and the ambiguity resolution vector 65 are stored in the NVRAM 41.

When the RECOVER_PRIVATE_KEY routine 53 is initiated, firstly the cryptography unit 19 initiates, in step S61, the capture of M (where M>2) images of the fingerprint by the fingerprint sensor 17 and receives the corresponding image data. The cryptography unit 19 then processes, in step S63, the image data for each of the M images to identify the origin and the minutiae, thereby forming M feature templates.

For each of the M feature templates, the cryptography unit 19 then aligns, in step S65, the minutiae using the alignment vector of the ambiguity resolution vector. In particular, as in the ENROL_USER routine, the cryptography unit 19 first identifies the principal minutia and the secondary minutiae, forms a principal axis by extending a straight line from the origin through the principal minutia, and normalises the distances from the origin to the minutiae using the distance between the origin and the principal minutia as a normalisation distance. The cryptography unit 19 then compares the (r,θ) co-ordinates for all but one of the secondary minutiae with the (r,θ) co-ordinates of the corresponding secondary minutiae stored in the reference alignment data and determines a transform to compensate for image distortion. This transform is then applied to the co-ordinates of all the minutiae and the transformed (r,θ) co-ordinates of the remaining secondary minutia are then compared with the (r,θ) co-ordinates of the corresponding secondary minutia in the reference alignment data to check that the transform was adequate.

After the minutiae of each of the M feature templates have been aligned using the alignment vector, the cryptography unit 19 then excludes, in step S67, all minutia whose (r,θ) co-ordinates match, within a predetermined normalised distance, (r,θ) co-ordinates stored in the exclusion vector in order to remove unreliable minutia. For each of the M feature templates, the minutiae are then indexed, in step S69, in order of increasing value of the angle θ. The cryptography unit 19 then identifies from the sequence resolution vector the index numbers of groups of minutiae for which there may be sequence ambiguity due to similar values of angle θ, and applies the secondary indexing rule stored in the encoding data of the ambiguity resolution vector, in this embodiment ordering in increasing value of normalised distance r, to order these groups of minutiae.

Having indexed the minutiae in each of the M feature templates, feature values for each of the minutiae are determined. First, the cryptography unit 19 determines, in step S71, the position values for each minutia (i.e. the attribute values for the normalised distance r and the angle θ). In particular, for each minutia the normalised distance r and the angle θ in each feature template are quantised by dividing by the respective quantisation units stored in the feature vector for the minutia. These quantised values are then adjusted by adding the corresponding offset values stored in the feature vector for the minutia. The adjusted values are then truncated to respective integer numbers of quantisation units to give the position values.

The offset value has the effect that the probability that each position value will be correct matches the probability used to determine the quantisation unit. In other words, the offset value reduces the chance that the measurement of the attribute value is on the wrong side of the quantisation level backing to an incorrect position value. However, by comparing for each minutia the position values calculated for the M feature templates and selecting the position values which appear most frequently then the likelihood of the position values being incorrect is greatly reduced.

Secondly, for each minutia the cryptographic unit 19 resolves, in step S73, any anomaly in categorisation. In particular, the category of each minutia is compared over the M feature templates. If there is no category resolution value stored in the feature vector for the minutia, the possibility of the category being misidentified is low and therefore the category is assigned based on which category is assigned most often in the M feature templates. However, if the feature vector for the minutia does store a category resolution value, then the two most commonly identified categories for the minutia in the M feature templates are identified and the higher or lower in the order of prominence is selected in accordance with the category resolution value, unless all of the M feature templates identify the same category in which case the identified category is used.

The cryptography unit 19 then generates, in step S75, the biometric value $K_{bio}$ by concatenating the category number and position values for the normalised distance r and angle θ of each measurement minutia to generate a feature vector for each measurement minutia, and then concatenates the feature vectors in index order to generate the biometric value $K_{bio}$. Finally the cryptography unit generates, in step S77, the private key $K_{pri}$ by adding the mapping key $K_{map}$ stored in the NVRAM 41 to the biometric value $K_{bio}$.

As those skilled in the art will appreciate, messages encrypted with a private key $K_{pri}$ generated using the RSA algorithm can only be decrypted using the corresponding public key $K_{pub}$, and similarly messages encrypted with a public key $K_{pub}$ generated using the RSA algorithm can only be decrypted using the corresponding private key $K_{pri}$. These properties are put to two main uses, to create digital signatures authenticating the source and integrity of a message and to encrypt a message so that only the desired recipient can decrypt the message.

In this embodiment, the SIGN_MESSAGE routine 55 stored in the ROM 37 is used to create a digital signature which authenticates the source and integrity of a message. When the user 21 wishes to attach a digital signature to a message, a copy of the message is transmitted from the computer 1 to the cryptography unit 19. As shown in FIG. 10, the cryptography unit 19 receives, in step S81, the message and then checks, in step S83, if the private key $K_{pri}$ is currently generated.

If the private key is not currently generated, the cryptography unit 19 runs, in step S85, the RECOVER_PRIVATE_KEY routine to generate the private key $K_{pri}$. This requires the presence of the user 21 in order to generate the biometric key $K_{bio}$. If the private key $K_{pri}$ is currently generated, or after the RECOVER_PRIVATE_KEY routine has been run (step S85), the cryptography unit 19 generates, in step S87, the digital signature. In this embodiment, the digital signature is generated by a two-step process. Firstly, the cryptography unit 19 applies the conventional Secure Hashing Algorithm (SHA) to create a first one-way hash. Those skilled in the art will appreciate that a one-way hash is a fixed length number generated from data of arbitrary length from which it is not possible to recover the original data. The first one-way hash is then encrypted using the generated private key $K_{pri}$ to generate the digital signature.

The digital signature is then transmitted, in step S89, to the computer 1, which attaches the digital signature to the original message to form a signed message and transmits the signed message to a desired recipient. The desired recipient is then able to, in a conventional manner, separate the signed message into the original message and the digital signature, apply the Secure Hashing Algorithm to the original message to generate a second one-way hash and decrypt the digital signature, using the public key $K_{pub}$ corresponding to the private key $K_{pri}$ of the user 21, to recover the first one-way hash. If the first one-way hash is identical to the second one-way hash, then the recipient can be confident both that the user 21 was the source of the message and that the message had not been tampered with in transit.

In this embodiment, the DECRYPT_MESSAGE routine 57 is used to decrypt a message which has been encrypted using the public key $K_{pub}$ corresponding to the private key $K_{pri}$ of the user 21. On receipt of an encrypted message, the computer 1 transmits the encrypted message to the cryptography unit 19. As shown in FIG. 11, the cryptography unit receives, in step S91, the encrypted data and then checks, in step S93, if the private key $K_{pri}$ is currently generated.

If the private key is not currently generated, the cryptography unit 19 runs, in step S95, the RECOVER_PRIVATE_KEY routine to generate the private key $K_{pri}$. This requires the presence of the user 21. If the private key $K_{pri}$ is currently generated, or after the RECOVER_PRIVATE_KEY routine has been run (step S95), the cryptography unit 19 decrypts, in step S97, the received encrypted data using the private key $K_{pri}$. The cryptography unit 19 then sends the decrypted data to the computer 1.

In the first embodiment, a dedicated cryptography unit is used to process the biometric data and to perform cryptographic operations. However, these operations could instead be performed by computer programs executed by a conventional computer.

A second embodiment will now be described, with reference to FIGS. 12 to 15, in which the user 21 is able to use any of a number of computer terminals connected to a local area network (LAN). In the second embodiment, the biometric data is processed and the cryptographic operations are performed by whichever computer terminal the user 21 is currently using.

FIG. 12 is a schematic block diagram showing a LAN 101 to which are attached a computer terminal 103, a public server 105 and a secure server 107. As shown in FIG. 12, the computer terminal 103 includes a processor 109 connected to a local hard disk 111, a RAM 113, a network port 115, a USB (Universal Serial Bus) port 117 and a keyboard 118 (other components of the computer terminal 103 have not been shown for ease of illustration). A fingerprint sensor 119 is connected to the computer terminal 103 via the USS port 117. Although not shown in FIG. 12, a number of additional computer terminals are attached to the LAN 101 together with other network devices such as printers, modems and the like.

The public server 105 is a conventional file server which is accessible by any application run by any of the computer terminals 103. The data stored in the public server 105 cannot, therefore, be considered secure.

As shown in FIG. 12, the secure server 107 includes a secure data store 121 which is connected to the LAN 101 via an authentication and data transfer unit 121. The authentication and data transfer unit 121 receives and processes requests for data stored in the secure data store 121. In particular, the authentication and data transfer unit 121 identifies the source of the request and checks that the identified source has access rights to the requested data. If the access request is authenticated, the authentication and data transfer unit 123 retrieves the requested data from the secure data store 121 and transmits the requested data to the source of the request. In this embodiment, the secure server 107 has its own private key and public key pair.

In this embodiment, the secure server 107 includes a Secure Execution Engine (SEE) manufactured by nCipher Corporation Limited, the operation of which is described in International Patent Publication WO 01/63385 (whose content is hereby incorporated by reference). The Secure Execution Engine allows processing operations to be securely performed at the secure server 107 using code which has been certified by a trusted authority as to the processing operations performed by the code. In this embodiment, the code run by the Source Execution Engine can process requests for data stored in the secure data store 121 to verify that the requestee is entitled to access, retrieve the stored data from the secure data store 121, and perform any cryptographic operations such as decrypting received messages, verifying digital signatures and encrypting transmitted messages. In this way, the secure server 107 is resistant to software attacks. The secure server 107 is also a tamper-proof environment, making it resistant to hardware attacks. In this way a user can have confidence that no unauthorised party has access to data stored in the secure server 107.

In this embodiment, the biometric value $K_{bio}$ is used to generate a strong private key $K^s_{pri}$ and a weak private key $K^w_{pri}$ using a strong mapping key $K^s_{map}$ and a weak mapping key $K^w_{map}$ respectively. As suggested by the nomenclature, the strong private key $K^s_{pri}$ has higher entropy than the weak mapping key $K^w_{pri}$ and therefore messages encrypted by the strong private key $K^s_{pri}$ are inherently more resilient to a brute force decryption attack than messages generated using the weak private key $K^w_{pri}$. In particular, in this embodiment the strong private key $K^s_{pri}$ is a 1024 bit number generated by the RSA algorithm whereas the weak private key $K^w_{pri}$ is a 128 bit number generated by the RSA algorithm.

In this embodiment, the biometric value $K_{bio}$ has approximately the same entropy as the weak private key $K^w_{pri}$, and the weak mapping key $K^w_{map}$ is stored in the public server 105. The user is therefore able to generate the weak private key $K^w_{pri}$ at the computer terminal 103 by entering the biometric data using a fingerprint sensor 119, enabling the computer terminal 103 to generate the biometric value $K_{bio}$, and retrieving the weak mapping key $K^w_{map}$ from the public server 105.

Once the weak private key $K^w_{pri}$ has been generated, it is used to generate a digital signature which is sent to the secure server 107 along with a request for data, including the strong mapping key $K_{map}$, which is stored in the secure data store 121 and, in combination with the biometric value $K_{bio}$, allows the strong private key $K^s_{pri}$ to be generated.

The local hard disk 111 of the computer terminal 103 stores routines which are used during operation of the computer terminal 103. FIG. 13 illustrates four of the routines stored in the local hard disk 111 of the computer 103, namely DK_ENROL_USER 131, RECOVER_STRONG_PRIVATE_KEY 133, SIGN_MESSAGE 135 and DECRYPT_MESSAGE 137.

The DK_ENROL_USER routine 131, which is executed to enrol a new user, will now be described with reference to FIG. 14. As shown in FIG. 14, the computer terminal 103 receives, in step S101, user information identifying the new user via the keyboard 118. In this embodiment, the user information is formed by a user name and a password. The computer terminal then receives and processes, in step S103, biometric data corresponding to a fingerprint of the new user in the same manner as described with reference to FIGS. 7A, 7B and 8 for the first embodiment, to generate a biometric value $K_{bio}$ and an ambiguity resolution vector.

Once the biometric value $K_{bio}$ has been generated, the computer terminal 103 generates, in step S105, a weak private key $K^w_{pri}$ and a weak public key $K^w_{pri}$ pair using the RSA algorithm. The weak private key $K^w_{pri}$ and the biometric value $K_{bio}$ are then processed, in step S107, using a weak mapping function to generate a weak mapping key $K^w_{map}$. In this embodiment, the weak mapping key $K^w_{map}$ is generated by subtracting the biometric value $K_{bio}$ from the weak private key $K^w_{pri}$ as shown in equation 2.

$$K_{map}^w = K_{pri}^w - K_{bio} \quad (2)$$

The computer terminal 103 generates, in step S109, a strong private key $K^s_{pri}$ and a strong public key $K^s_{pub}$ pair and transmits, in step S111, the strong public key $K^s_{pub}$ to a certification authority. The computer terminal 103 also generates, in step S113, a random number $K_{rand}$ whose entropy is approximately equal to that of the strong private key $K^s_{pri}$.

The biometric value $K_{bio}$ and the random number $K_{rand}$ are then multiplexed to form a strong intermediate key, and the strong intermediate key and the strong private key $K^s_{pri}$ are processed, in step S115, using a strong mapping function to generate a strong mapping key $K^s_{map}$. In this embodiment, the strong intermediate key is generated by adding the biometric value $K_{bio}$ and the random number $K_{rand}$, the strong mapping key $K^s_{map}$ is generated by subtracting the intermediate key from the strong private key $K^s_{pri}$, as shown in equation 3.

$$K_{map}^s = K_{pri}^s - (K_{rand} + K_{bio}) \quad (3)$$

The computer terminal 103 then generates, in step 117, a secure data vector comprising data to be stored in the secure data store 121. In particular, the secure data vector comprises the user information, the weak public key $K^w_{pub}$, the strong mapping key $K^s_{map}$, the strong mapping function and the random number $K_{rand}$. The computer terminal 103 then encrypts the secure data vector using the public key of the secure server and sends, in step S119, the encrypted secure data vector to the secure server 107, which decrypts the encrypted secure data vector using its private key and then stores the secure data vector in the secure data store 121.

The computer terminal 103 then generates, in step S121, an open data vector comprising data to be stored in the public server 105. In particular, the open data vector comprises the user information, the ambiguity resolution vector and the weak mapping key $K^w_{map}$ and the weak mapping function. The computer 103 then sends, in step S123, the open data vector to the public server 105 for storage. Finally, the computer terminal 103 deletes, in step S125, the weak private key $K^w_{pri}$, the strong private key $K^s_{pri}$, the biometric value $K_{bio}$ and the biometric data from the RAM 113. Therefore, after the DK_ENROL_USER routine has been run the strong private key $K^s_{pri}$ and the weak private key $K^w_{pri}$ are not stored anywhere on or connected to the LAN 101.

Although the weak public key $K^w_{pub}$ has been termed in this embodiment a public key, it is not in fact publicly available (and therefore is not transmitted to a certification authority) and after the DK_ENROL_USER routine has been finished is only known to the secure server 107.

The RECOVER_STRONG_PRIVATE_KEY routine 133, which is executed to recover the strong private key $K^s_{pri}$ associated with an enrolled user, will now be described with reference to FIG. 15. Firstly, in step S133, the computer terminal 103 receives, in step S131, the user name and password for the user (i.e. the user information) via the keyboard 118. The computer terminal 103 then retrieves, in step S133, the open data vector associated with the received user information from the public server 105.

The computer terminal 103 then receives, in step S135, biometric data corresponding to the fingerprint of the user from the fingerprint sensor 119, via the USB port 117, and processes, in step S137, the received biometric data to generate the biometric value $K_{bio}$. The manner in which the biometric value is generated from the biometric data, using the ambiguity resolution vector which forms part of the open data vector, is identical to the method used in the first embodiment and will not, therefore, be described again.

The computer terminal 103 now generates, in step S139, the weak private key $K^w_{pri}$ using the generated biometric value $K_{bio}$, the weak mapping key $K^w_{map}$ and the weak mapping function from the open data vector. In particular, the weak private key $K^w_{pri}$ is generated by adding the weak mapping key $K^w_{map}$ and the biometric value $K_{bio}$.

The computer terminal 103 then sends, in step S141, a signed request to the secure server 107 for the secure data vector associated with the user information. In particular, the computer terminal 103 generates a message including the user information, a challenge token which is periodically updated by the secure server, and a randomly generated symmetric key. The purpose of the challenge token is to ensure the signed request periodically varies. The computer terminal 103 then generates a digital signature by applying the secure hashing algorithm to a copy of the generated message to form a first one-way hash, and encrypting the first one-way hash using the weak private key $K^s_{pri}$ to generate a digital signature which is attached to the original message to form the signed request. The signed request is then encrypted using the public key of the secure server 107 and transmitted to the secure server 107.

On receiving the encrypted signed request from the computer terminal 103, the authentication and data transfer unit 123 of the secure server 107 decrypts the encrypted signed request, using its private key, to recover the signed request and separates the signed request into the original message and the digital signature. The authentication and data transfer unit 123 then extracts the user information from the original message and retrieves the weak public key $K^w_{pub}$ from the secure data vector associated with the user information, decrypts the digital signature using the weak public key $K^w_{pub}$ to recover the first one-way hash and applies the SBA algorithm to the original message to create a second one-way hash. If the first one-way hash is identical to the second one-way hash, the authentication and data transfer unit 123 encrypts the secure data vector using the symmetric key received with the signal request and the weak public key $K^w_{pub}$ and transmits the encrypted secure data vector to the computer terminal 103. If, however, the first one-way hash is not identical to the second one-way hash then the authentication and data transfer unit 123 logs an unsuccessful request for the secure data vector associated with the user information. In this embodiment, as an additional security provision, if the authentication and data transfer unit 123 logs three unsuccessful requests for the secure data vector associated with the user information, then access to that secure data vector is blocked to all requests, including authentic requests, for a predetermined period of time. This reduces the chances of an interloper accessing the secure data vector by brute force (i.e. generating multiple signed requests using systematically varied cryptographic keys until the cryptographic key used matches the weak private key $K^w_{pri}$).

The computer terminal 103 receives, in step S143, the encrypted secure data vector and decrypts the encrypted secure data vector using the weak private key $K^w_{pri}$ to recover the secure data vector. The computer terminal 103 then generates, in step S145, the strong private key $K^s_{pri}$ using biometric value $K_{bio}$ together with the strong mapping key $K^s_{map}$, the strong mapping function and the random number $K_{rand}$ from the secure data vector. In particular, in this embodiment the strong private key $K^s_{pri}$ is generated by adding the strong mapping key $K^s_{map}$, and the random number $K_{rand}$ to form the intermediate key, and then adding the intermediate key and the biometric value $K_{bio}$.

Once the strong private key $K^s_{pri}$ has been generated, the user at the computer terminal 103 is able to sign messages with digital signatures generated using the strong private key $K^s_{pri}$ (using the SIGN_MESSAGE routine stored in the local hard disk 111) and decrypt using the strong private key $K^s_{pri}$ received messages which have been encrypted using the strong public key $K^s_{pub}$ (using the DECRYPT_MESSAGE routine stored in the local hard disk 111).

Modifications and Further Embodiments

In the first and second embodiments, a biometric value is calculated using image data representative of the fingerprint of a user. This biometric value forms an intermediate key linking a mapping key with a cryptographic key. This system will be referred to as Triple Key Cryptography.

Other sources of biometric data are available apart from fingerprints. For example the biometric data could be generated from a scan of an iris or a retina, or from a voice recording. The advantage of using biometric data is that the presence of a particular person is required to generate the biometric data. However, in the first and second embodiments the biometric data could be replaced by data representative of a different analogue source. For example, the analogue source could be a picture, an engraving or a jewel with an image sensor being used to generate representative data from which an intermediate key could be generated. Alternatively, the analogue source could be a purpose-designed object having sharply defined but random geometric properties that can be detected using ultra-sound to generate representative data.

Alternatively, the intermediate key could be generated from a combination of sources, not all of which need to be analogue. For example, the intermediate key could be generated by combining a first biometric value, which is determined from biometric data representing a fingerprint, a second biometric value, which is determined from biometric data representing an iris, and user inputs such as a password. In this way, the entropy of the intermediate key can be increased.

In the described embodiments, the intermediate key is generated by concatenating multiple attribute values. It will be appreciate that other ways of combining or multiplexing the attribute values could be used.

In the first embodiment, the mapping function which is applied to the intermediate key (i.e. the biometric value $K_{bio}$) and the mapping key $K_{map}$ is a simple addition. However, any mapping function which is monotonic, i.e. each set of input variables generates a unique output, could be used. For example, the mapping function could be a simple subtraction. It can be shown that the mapping function used does not affect the security of the system. A bit-wise exclusive-OR function could also be used both to combine the intermediate key and the cryptographic key to generate the mapping key, and subsequently to combine the intermediate key and the mapping key to generate the private key.

Preferably, the mapping function used to generate the cryptographic key from the intermediate key and the mapping key has an inverse function which facilitates the generation of the mapping key using the intermediate key and the cryptographic key.

In the first and second embodiments, an ambiguity resolution vector is stored which contains process instructions and variables which were determined by a training process to achieve a desired level of repeatability of the intermediate key while maintaining a high level of entropy. However, for Triple Key Cryptography it is not essential to use such an ambiguity resolution vector. For example, a simple voting mechanism over multiple samples could be used.

In the first embodiment a dedicated hardware device is used to process the biometric data to form the biometric value and to perform the cryptographic processes, whereas in the second embodiment these processes are performed by software running on a conventional computer.

Alternatively, the processing could be split between a dedicated hardware device and software run on a conventional computer. In an embodiment, the processing of the biometric data to generate the biometric value is performed by software running on a conventional computer, and the generated biometric value is transmitted to a dedicated hardware device (which stores the mapping key and the mapping function) which generates the cryptographic key and performs cryptographic operations. In this way, the cryptographic key is never sent to, or generated in, the computer.

Although the description has concentrated on asymmetric encryption systems, Triple Key Cryptography could also be used for generating a symmetric key.

An application of triple key cryptography is to restrict access to the medical records of a patient to when the patient is present. In particular, medical records for a plurality of patients are stored in a data base along with respective identification numbers. A separate data base stores for each patient corresponding user information, a mapping key and an encrypted identification number. Biometric data representative of the patient is then processed to generate an intermediate key representative of the patient. The Intermediate key is then combined with the mapping key associated with the patients user information to generate the cryptographic key which is used to decrypt the encrypted identification number. The patients records are then located in the medical record data base by retrieving the medical records corresponding to the decrypted identification number.

The first embodiment describes a technique for generating a number from image data representative of a fingerprint using stored process instructions and variables generated by a training process. This technique could also be applied to generate data from other biometric data, for example a voice pattern or the image of an iris or a retina. Alternatively, this technique could be applied to data from other analogue sources such as pictures and sound recordings. Further, this technique has applications outside the field of cryptography. For example, a number generated from biometric data could be used as a password.

In order to generate a number from data representative of an analogue source it is necessary to determine what attributes of the data you are going to consider. During the enrolment of a new user, attributes which are most likely to give a repeatable value are determined and information identifying these attributes is stored.

In the first embodiment, features (i.e. minutiae of a fingerprint) are identified and extracted from the data, and the ambiguity resolution vector stores alignment data, exclusion data and sequence resolution data which are used when processing subsequent images of the fingerprint to identify more reliably the minutiae whose attributes are going to be measured. In other embodiments, for example the processing of an iris scan, rather than extracting features from the data, the data is segmented into blocks. In this case, during the enrolment of a user optimal segment sizes can be determined and details of these segment sizes stored in the ambiguity resolution vector.

Although the ambiguity resolution vector can be used to identify more reliably the attributes to be considered, the values of these attributes can still vary from one set of data to the next. Generally, the value of an attribute will either be a number corresponding to the classification of the attribute, for example the category number of a minutia in the first embodiment, or a direct measurement of a property of the attribute, for example the position values for a minutia in the first embodiment. As described in the first embodiment, the ambiguity resolution vector can store information which allows these values to be more reliably obtained.

In the first embodiment, after adjusting a quantised value using an offset value stored in the offset vector to move the quantised value towards a point midway between two quantisation levels, the adjusted value is truncated to give a position value. In other words, the adjusted value is rounded down to the nearest quantisation level. Alternatively, the adjusted value could be rounded up to the nearest quantisation level. In an alternative embodiment, the offset values are used to adjust the quantised values towards the nearest quantisation level, and the adjusted level is rounded to the nearest quantisation level.

Although in the first embodiment the offset value is used in combination with a quantisation unit which is determined to achieve a desired repeatability, offset value could also be used with arbitrary quantisation units to move on attribute value away from a boundary level separating two "low-resolution" position values.

Those skilled in the art will appreciate that it is not essential for all of the above factors to be taken into consideration when generating the ambiguity resolution vector for there still to be a significant improvement in the repeatability of a number generated from data representative of an analogue source.

In the first embodiment, the origin of a fingerprint pattern is found by identifying the point of maximum ridge curvature. In an alternative embodiment, an origin is identified in the data representative of the first image of the fingerprint, and the ridge pattern at the origin is stored in the ambiguity resolution vector. The origin can then be located in data representative of subsequent images of the fingerprint by a pattern recognition process using the stored patter data.

As described, as well as computer apparatus and processes performed in the computer apparatus, the invention also extends to computer programs, particularly computer programs on or in a carrier, adapted for putting the invention into practice. The computer program may be in the form of source code, object code, a code intermediate source and object code such as in partially compiled form, or in any other form suitable for use in the implementation of the processes according to the invention.

The carrier may be any entity or device capable of carrying the program. For example, the carrier may comprise a storage medium such as a ROM, for example a CD ROM or a semiconductor ROM, or a magnetic recording medium, for example a floppy disk or hard disk. Further, the carrier may be a transmissible carrier such as an electrical or optical signal which may be conveyed via electrical or optical cable or by radio or other means.

When the program is embodied in a signal which may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant processes.

The invention claimed is:

1. A system for providing a cryptographic key using an external key, the system comprising:
a first data store for storing an authorization key;
a second data store, separate from the first data store, for storing a secure key and a public key, wherein the secure key comprises one of the cryptographic key and a number required to generate the cryptographic key, and wherein the public key is associated with an associated private key by an asymmetric encryption algorithm;

an access controller operable to allow access to the secure key stored in the second data store only to an access request accompanied by a digital signature generated using the private key corresponding to the stored public key;

a key generator operable to receive an external key and to generate the private key using the received external key and the stored authorization key using a mapping function; and an access request signal generator operable to generate a digital signature using the private key and to transmit an access request, including the generated digital signature, to the access controller in order to retrieve the secure key.

2. A system according to claim 1, wherein the key generator is a first key generator, wherein the mapping function is a first mapping function, wherein the secure key comprises a number required to generate the cryptographic key, wherein the second data store further comprises a further number, said further number and said secure key having a greater entropy than the external key, and wherein the system further comprises a second key generator operable to combine said further number and the external key to generate a combined key, and to generate the cryptographic key using the combined key and the secure key in accordance with a second mapping function.

3. A system according to claim 1, wherein the first mapping function and the second mapping function are the same function.

4. A system according to claim 1, wherein the access controller is operable to log unsuccessful access requests and to deny all further access requests if the logged unsuccessful access requests satisfy a predetermined criterion.

5. A system according to claim 1, wherein the access request signal generator is arranged to include in the access request a third cryptographic key for symmetric encrypted communication between the key generator and the second data store.

6. A system according to claim 1, wherein the apparatus is formed from multiple devices connected to a computer network.

7. A system according to claim 1, further comprising a decrypter operable to decrypt an encrypted message using the generated cryptographic key.

8. A system according to claim 1, further comprising a digital signature generator operable to generate a digital signature using the generated cryptographic key.

9. A system according to claim 1, further comprising an external key generator operable to generate the external key from received data representative of an analogue source.

10. A system according to claim 9, further comprising a sensor operable to generate biometric data representative of a feature of a human being, wherein the external key generator is operable to generate the external key from said biometric data.

11. A system for providing a cryptographic key using an external key, the system comprising:

a first server having a first data store for storing an authorization key;

a second server having:
  a second data store for storing a secure key wherein the secure key comprises a number required to generate the cryptographic key; and
  an access controller operable to allow access to the secure key stored in the second data store only to an access request accompanied by a digital signature generated using a private key corresponding to the stored secure key; and a network device having:
  a key generator operable to generate an external key and to generate the private key using the generated external key and the authorization key using a mapping function; and
  an access request signal generator operable to generate a digital signature using the private key and to transmit an access request, including the generated digital signature, to the access controller in order to retrieve the secure key, and
  a cryptographic key generator operable to generate the cryptographic key using the external key and the secure key.

12. A system according to claim 11, wherein the network device further comprises:

a sensor operable generate biometric data representative of a feature of a human being; and an external key generator operable to generate the external key from said biometric data.

13. A system according to claim 12, wherein the key generator is a first key generator, wherein the mapping function is a first mapping function, wherein the second data store further comprises a further number, said further number and said secure key having a greater entropy than the external key, and wherein the cryptographic key generator is operable to combine said further number and the external key to generate a combined key, and to generate the cryptographic key using the combined key and the secure key in accordance with a second mapping function.

* * * * *